United States Patent [19]

Gregoire

[11] Patent Number: 5,553,635
[45] Date of Patent: Sep. 10, 1996

[54] MICROVALVE FOR FLUID DELIVERY SYSTEM

[75] Inventor: Roger J. Gregoire, Bulverde, Tex.

[73] Assignee: Praxair Technology, Inc., Danbury, Conn.

[21] Appl. No.: 276,578

[22] Filed: Jul. 18, 1994

[51] Int. Cl.⁶ .................. F16K 31/126; F16K 31/122
[52] U.S. Cl. .................. 137/1; 251/63.6; 251/282
[58] Field of Search .................. 251/63.6, 282, 251/63.5, 335.3; 137/1

[56] References Cited

U.S. PATENT DOCUMENTS

| | | |
|---|---|---|
| 4,309,022 | 1/1982 | Reinicke et al. .......... 251/63.6 X |
| 4,431,159 | 2/1984 | Stubbs .......... 251/63.6 |
| 4,526,341 | 7/1985 | Thomas . |
| 4,634,099 | 6/1987 | Danko et al. . |
| 4,687,017 | 8/1987 | Danko et al. . |
| 4,712,576 | 12/1987 | Aruzumi et al. . |
| 4,763,690 | 8/1988 | Martin . |
| 4,995,589 | 2/1991 | Adishian et al. . |

Primary Examiner—Kevin Lee
Attorney, Agent, or Firm—Cornelius F. O'Brien

[57] ABSTRACT

A fluid delivery force-actuated valve, such as a gas delivery pneumatic-actuated valve suitable for use in the electronic industry, employing bellows means so that the actuation means can be used to open or close the valve independent of the force of the pressurized fluid. A method for delivering the pressurized fluid, such as gas, is also disclosed.

20 Claims, 2 Drawing Sheets

MICROVALVE FOR FLUID DELIVERY SYSTEM

FIELD OF THE INVENTION

This invention relates to a fluid delivery force-actuated valve suitable for use in pressure fluid delivery systems such as gas delivery systems and particularly to a valve using bellow means so that the valve can operate substantially independently of the pressure of the fluid to be delivered.

DESCRIPTION OF THE PRIOR ART

In the semiconductor manufacturing industry and in various other industrial operations, gas cabinets are used to deliver high purity process gases to a point-of-use location, commonly referred to as a tool location. Such cabinets contain high purity gas supply cylinders and gas panels for delivering gases to the tool location. For high purity gas operations, it is essential that the process gases be delivered to the tool location with minimum contamination since even parts-per-million impurity levels can adversely affect the efficiency of semiconductor and other high purity products. In addition, it is necessary to assure that the gas panels are capable of operating safely and without gas leakage that could jeopardize the health and safety of gas cabinet operators. Gas panels are thus required to deliver gases at desired pressure levels while maintaining gas purity and maintaining safety integrity. The panels must also provide for purge functions to enable gas cylinder changes to be performed safely and without gas contamination. For such purpose, typical gas panels consists of specialized valves, components, interconnecting piping and associated hardware, with high purity, hazardous cylinders of gas being attached to the inlet to the gas panel, and the outlet thereof, attaching through a suitable pipeline to a process reactor.

There has been many types of valves used in the prior art for delivery of gases at various pressures. Bellow type valves have been used in applications where purity and/or safety is of primary importance, such as found in the semiconductor and other high tech industries which employ pure and/or hazardous (corrosive, flammable, toxic, etc.) gases. Examples of the prior art are disclosed in U.S. Pat. Nos. 4,526,341; 4,634,099; 4,687,017; 4,712,576; 4,763,690; and 4,995,589.

Prior art valves have pressure dependent valve sealing forces which can limit the life of the valve seal and could create an unsafe condition in the event of an overpressure condition. A compression spring typically biases the valve seal to the valve "closed" position. When the inlet pressure is applied, some of the spring (biasing) force is canceled out due to the inlet pressure acting on the seal area and creating an opposing force. The valve sealing force is inversely proportional to the inlet pressure. This means, the higher the inlet pressure, the lower the biasing force attempting to keep the valve in the "closed" position. The seal, therefore, must be sensitive enough to provide positive sealing at high pressure/low biasing force conditions, and, durable enough to withstand significant extrusion forces at low pressure/high biasing force conditions. If the inlet pressure were to inadvertently increase above the maximum rated pressure, the valve could fail in the "open" position, thereby creating an unsafe condition. U.S. Pat. No. 4,763,690 discloses a valve that does provide a fail-safe closing in the event of an overpressure condition in which the sealing force is directly proportional to inlet pressure. Prior art high pressure type valves are generally not feasible to multi-integrate into a single body due to the physical size of its pneumatic actuator. A proportional relationship exists between actuator size and its valve operating pressure rating. Attempts to integrate more than two valves, particularly the high pressure valves, can diminish the potential purity, safety and modularity benefits while increasing associated costs, weight, fabrication problems, and installation problems. It therefore becomes more advantageous to weld individual valves together, than to integrate these types of valves into a single body.

It is an object of the present invention to provide a fluid delivery force-actuated valve that effectively operates independently of fluid inlet pressure.

It is another object of the present invention to provide a fluid delivery force-actuated valve that employs bellow means to effectively cancel the pressure force of the fluid so that actuating means of the valve operates independent of the inlet pressure force of the fluid.

It is another object of the present invention to provide a gas delivery pneumatically-actuated valve ideally suited for use in delivering high purity gas for the electronic industry.

Another object of the present invention is to provide a fluid delivery force-actuated valve that is cost effective to produce.

With these and other objects in mind, the invention is hereinafter described in detail, and the novel features thereof being particularly pointed out in the appended claims.

SUMMARY OF THE INVENTION

The invention relates to a fluid delivery force-actuated valve comprising at least one inlet port communicating with a first chamber containing bellow means; at least one outlet port communicating with a second chamber; a passage connecting said first chamber to said second chamber; moveable means for blocking said passage to prevent fluid flow from passing between the chambers, said moveable means having a biasing force to maintain it in a first position to block said passage and when a force exceeding the biasing force is applied opposite to the biasing force, the moveable means is moved to a second position to open said passage; said bellow means associated with said moveable means such that when a force from a pressurized fluid fed into the first chamber directly against the moveable means to move it to the second position, the bellow means will be contracted by said pressurized fluid and said bellow means will place a force on the moveable means to maintain said moveable means in the first position so that the force of the pressurized fluid to move the moveable means to the second position is effectively canceled by the force from the bellow means acting on the moveable member to maintain it in the first position; and wherein a force applied to the moveable means that exceeds the biasing force moves the moveable means to the second position to unblock the passage and permits fluid to flow between the chambers substantially independent of the force of the pressurized fluid.

A preferred embodiment of the invention is to have the inlet port located such that the input fluid to the first chamber is directed to the top or upper portion of the bellow means and the output port located such that the fluid is discharged from the first chamber at the bottom of the bellow means. This will force the fluid to be fed around the bellows thereby preventing any entrapment of the fluid within the first chamber and thus ensure the purity of the fluid being delivered.

Although the fluid can be gas or liquid, the preferred fluid is gas. The force to actuate the valve can be any force such as force from a solid, liquid or gas acting against the actuative means of the valve. The valve could be combined other similar valves to provide a multitude of valves assembled in a relatively small block that can be used to control the flow of fluids, such as gases, between storage tanks or cylinders and work places. The benefits of the gas delivery pneumatic-actuated valves of this invention are:

a) purity enhancements—reduced wetted surface areas, reduced purgeable volumes, reduced entrapment areas, and reduced seals to atmosphere (gaseous contamination source);

b) safety enhancements—reduced leak potentials from sources such as seals to atmosphere, mechanical connections, and weld joints;

c) minimal effluent/abatement volumes; and d) cost effectiveness—reduced inventory requirements; reduced assembly/fabrication labor; and simplifies systems design and service.

The invention also relates to a method for providing a fluid delivery system in which pressurized fluid fed into an input port and discharged from an output port can be regulated upon an application of a force independent of the pressure of the fluid, said method comprising the steps:

a) providing an enclosed first chamber for receiving an input fluid; providing an enclosed second chamber for receiving the fluid to be discharged from the first chamber; and providing a passage between said first chamber and said second chamber;

b) providing moveable valve seal means for closing or opening said passage and providing a biasing means to maintain said moveable valve seal in the closed position;

c) providing bellows in said first chamber attached to the moveable valve seal means so that an incoming fluid will exert a force directly on the bellows that will be directed on the moveable valve seal means to maintain it in the closed position while simultaneously the incoming fluid will exert a force directly on the moveable valve seal means to open said passage and selecting said bellows so that the force exerted by the bellows on the moveable valve seal means is equal to or greater than the force exerted directly on the moveable valve seal means by the incoming fluid; and d) supply an incoming pressurized fluid to the first chamber and a separate force against the moveable valve means to move it to the second position so that said incoming pressurized fluid is fed from the first chamber into said second chamber for discharge and said flow is continued or stopped depending on the separate force applied against the moveable valve seal means independent of the force of the incoming pressurized fluid.

The effective canceling out of the forces of the pressure associated with the fluid enables the biasing meaning, such as a spring, for the actuator to be sufficient only to create positive sealing thereby resulting in a large significant downsizing of the biasing means. Thus the actuation force needed to overcome the biasing means can be greatly reduced. An assembly of valves in a block could be made using a port or passage that could be common to two or more valves. Each valve's inlet or outlet chamber can be ported to a common passageway so that one port on the valve can be connected to another port on a different valve. Thus a large variety of interconnected configurations can be easily accomplished.

BRIEF OF THE DRAWINGS

DETAILED DESCRIPTION OF THE DRAWINGS

Figure 1:
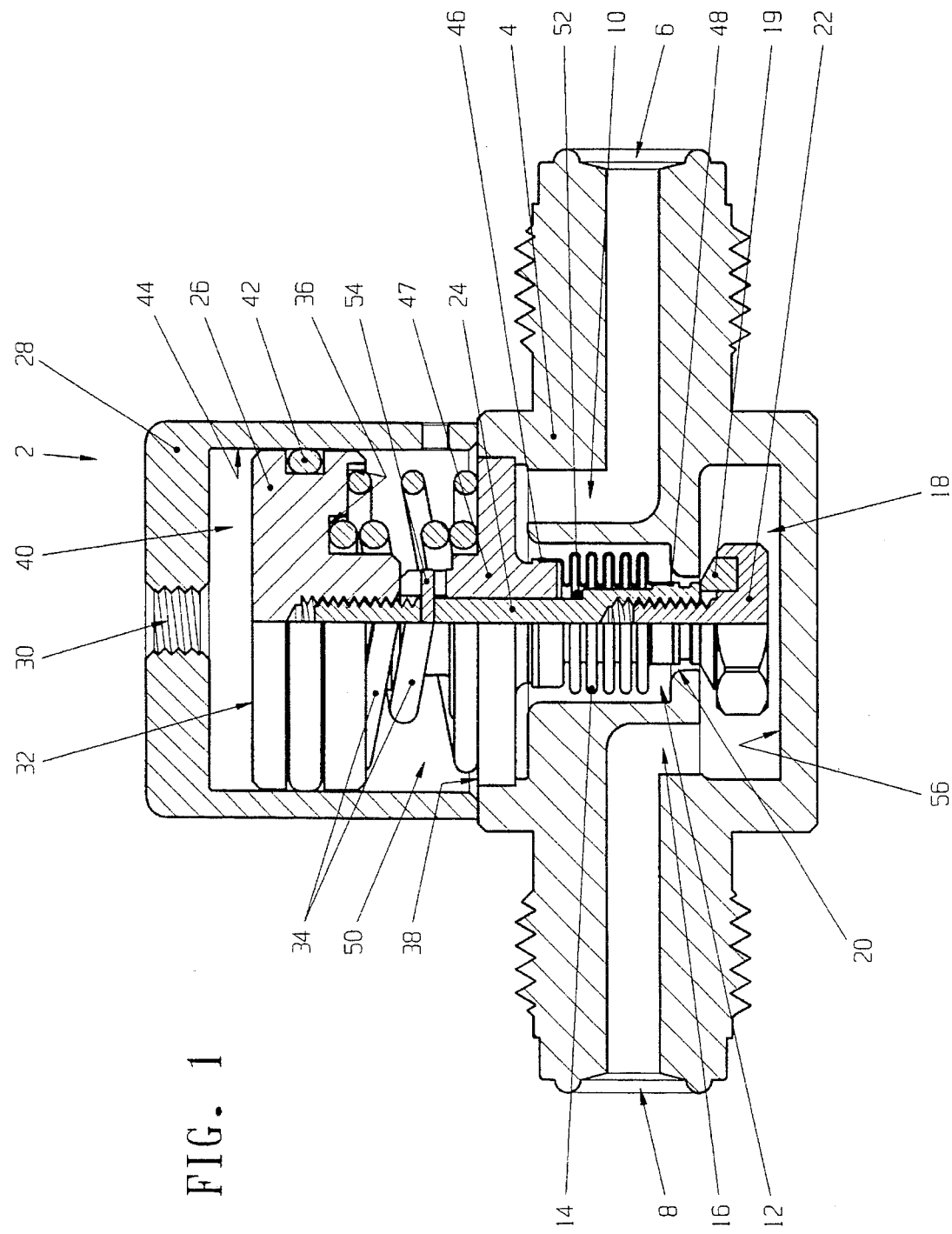
FIG. 1 is a side elevation mostly in cross-section of a fluid delivery force-actuated valve of this invention.

FIG. 1 shows a fluid delivery force-actuated valve 2 comprising a valve body 4 having an inlet port 6 and outlet port 8. Inlet port 6 connects via passage 10 with chamber 12 containing bellows 14. Outlet port 8 connects via passage 16 with chamber 18. A passage 20 at the lower end of chamber 12 communicates with chamber 18. A poppet 22 is disposed in chamber 18 and has a valve seal 19 that is positioned over passage 20 so that it can block passage 20 to prevent fluid flow into chamber 18 when it is forced over the opening in passage 20 or allow fluid flow when it is spaced apart from the opening in passage 20. Poppet 22 is secured to stem 24 which in turn is secured to actuator piston 26 disposed within actuator housing 28. Opening 30 within actuator housing 28 permits an external force from a gas, solid or liquid means to contact the face 32 of actuator piston 26 and move it axially downward so that it forces poppet 22 to move valve seal 19 away from passage 20 of chamber 12. To maintain valve seal 19 in the closed position over passage 20, a compression spring(s) 34 is disposed between face 36 of piston 26 and face 38 of valve body 4. Preferably, compression spring(s) 34 is selected to apply a preselected force against piston 26 in the upright direction so that valve seal 19 will be biased to close passage 20 in the steady state condition. When a force from a fluid, such as gas, is used to actuate piston 26, the gas is maintained in chamber 40 by using a suitable O-ring 42 disposed in piston 26 which engages the inner wall 44 of actuator housing 28. A spiral pin 54 is shown in FIG. 1 and is used to prevent twisting of bellows 14 during poppet assembly. As also shown in FIG. 1, the lower inner wall 56 of valve body 4 will limit the distance stem 24, via poppet 22, can travel downward.

Bellows 14 is disposed within chamber 12 and at one end 46 is sealingly secured to an end cap 47 which becomes secured to valve body 4, and the opposite end 48 is secured to stem 24. This provides the bellows 14 as a seal to atmosphere or chamber 50. An O-ring 52 is shown as a back up seal to chamber 50 for bellows 14. Thus internal pressure of the bellows is preferably atmospheric pressure or it could be any pressure desired. The bellows 14 is designed so that as a pressurized fluid, such as gas, is fed into chamber 12 it will exert a force against valve seal 19 and simultaneously a force to contract bellows 14. The force applied to bellows 14 will force the bellows 14 to contract. Since end 46 of bellows 14 is secured to valve body 4 via end cap 47, end 46 will remain stationary. However, end 48 of bellows 14 is secured to stem 24 and will move in the upright direction forcing stem 24 upward so that valve seal 19 is maintained to block passage 20. The bellows 14 is designed so that the force of the incoming pressurized gas against valve seal 19 in the downward direction is substantially equal to the force of the contracted bellows applied to stem 24 so that the force of the incoming fluid is effectively canceled with respect to valve seal 19. The preferred method to insure that the force of the incoming fluid is effectively canceled with respect to valve seal 19 is to design the bellows such that the effective area of the bellows 14 is equal to or slightly larger than the effective area of the valve seat. The effective area of the valve seat is the cross-sectional area of passage 20 and the effective area of the bellows 14 is approximately equal to the mean diameter between the outer diameter and inner diameter squared and then multiplied by 0.785. Thus it is the equivalent piston area that will produce the same fluid displacement that the bellows would produce for the same displacement in compression or extention.

Figure 2:
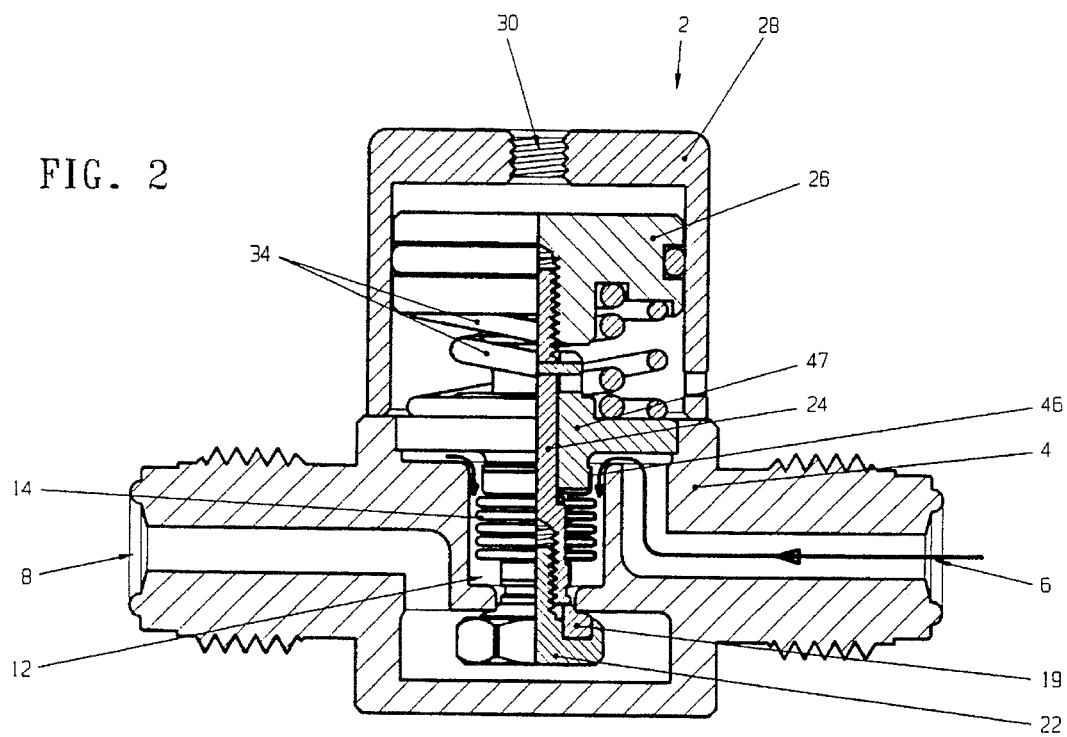
FIG. 2 is a side elevation mostly in cross-section of the fluid delivery force-actuated valve of FIG. 1 shown in the closed position.
Figure 3:
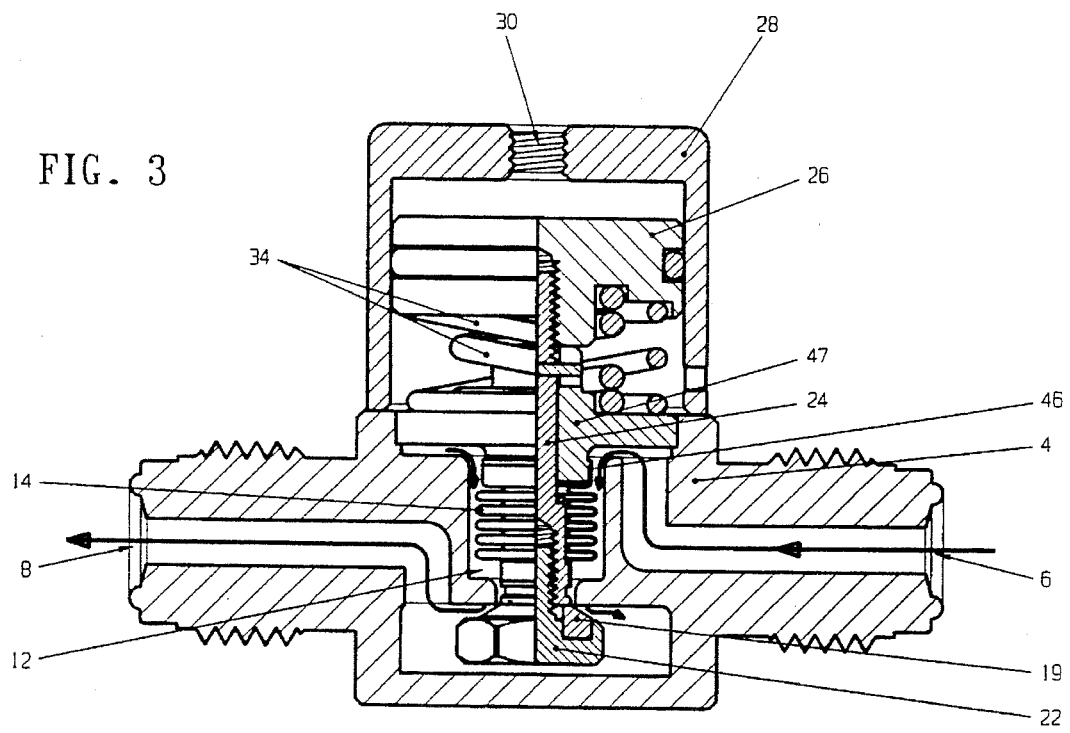
FIG. 3 is a side elevation mostly in cross-section of the fluid delivery force-actuated valve of FIG. 1 shown in the open position.

FIGS. 2 and 3 show the fluid delivery force-actuated valve of FIG. 1 and identical components are identified with the same reference number. In FIG. 2, the valve 2 is shown in the closed position. In this view compression spring 34 exerts an upward force against piston 26 which in turn forces poppet 22 upward and thereby causes valve seal 19 to be seated over passage 20. This will prevent any communication of fluid between chamber 12 and chamber 18. Even if a pressurized fluid is fed into the inlet port 6, the force of this fluid will be exerted against valve seal 19 and bellows 14. With the novel bellows arrangement of this invention, the force exerted by the contracted bellows 14 on stem 24 to move it in the upward direction will be equal to or slightly larger than force exerted against valve seal 19 by the pressurized fluid. Thus even when a pressurized fluid is fed into the inlet port 6, it will not open valve seal 19. The only way to open valve seal 19 is to apply a downward force against piston 26 which will be sufficient to overcome the force acting on piston 26 by compression spring 34. As shown in FIG. 3, a force, such as a pneumatic pressure fed into opening 30 of actuator housing 28, which is larger than the upward force of compression spring 34, will project stem 24 downward and thus open valve seal 19. This will allow fluid, such as gas to flow from the inlet port 6 to the outlet port 8.

The force needed to open valve 2 as shown in FIG. 3, can be varied by varying the pressure, piston area, and/or spring force.

Preferably the fluid delivery force-actuated valve of this invention should have one inlet port, one outlet port, and the bellows should be designed so that the pressure acting on the bellows will always exert an upward force equal to or slightly greater than the downward force acting on the valve seal, so that without an actuation force, the valve will not be opened.

As shown in FIGS. 1, 2 and 3, an incoming pressurized fluid will enter chamber 12 at the top, circulate around bellows 14, and discharge at the lower end of chamber 12. This will prevent any entrapment of fluid pockets within chamber 12 and thereby insure the delivery of high purity fluid flow.

What is claimed:

1. A fluid delivery force-actuated valve comprising at least one inlet port communicating with a first chamber containing bellow means; at least one outlet port communicating with a second chamber; a passage connecting said first chamber to said second chamber; moveable means for blocking said passage to prevent fluid flow from passing between the chambers, said moveable means having a biasing force to maintain it in a first position to block said passage and when a force exceeding the biasing force is applied opposite to the biasing force, the moveable means is moved to a second position to open said passage; said bellow means associated with said moveable means such that when a force from a pressurized fluid is fed into the first chamber against the moveable means to move it to the second position, the bellow means will be contracted by said pressurized fluid and said bellow means will place a force on the moveable means to maintain it in the first position, and said force directed on the moveable means by the pressurized fluid and said force directed on the moveable means by the bellow means being substantially equal so that the force of the pressurized fluid to move the moveable means to the second position is substantially canceled by the force from the bellow means acting on the moveable member to maintain it in the first position; and wherein a force applied to the moveable means that exceeds the biasing force on the moveable means will move the moveable means to the second position and unblock the passage to permit fluid to flow between the chambers substantially independent of the force of the pressurized fluid.

2. The fluid delivery force-actuated valve of claim 1 wherein said inlet port communicates with the first chamber.

3. The fluid delivery force-actuated valve of claim 1 wherein said outlet port communicates with the second chamber.

4. The fluid delivery force-actuated valve of claims 3 wherein said inlet port communicates with the first chamber, said one inlet port positioned to direct the incoming fluid at the top of the bellow means in the first chamber and said first chamber having a discharge to the passage located at the bottom of the bellow means so that the incoming fluid will be forced to circulate around the bellow means in the first chamber.

5. The fluid delivery force-actuated valve of claim 1 wherein said moveable means comprises a piston secured to seal means and said seal means positioned within the second chamber where it can move to a first position to block said passage between the chambers and to a second position away from said passage so that fluid can be fed from the inlet port to the outlet port.

6. The fluid delivery force-actuated valve of claim 1 wherein said bellow means is associated with said moveable means so that when a force from a pressurized fluid is fed into the first chamber, the bellow means will be contracted and place a force that is greater than the force the pressurized fluid will place directly on the moveable means so that the moveable means will be maintained in the first position.

7. The fluid delivery force-actuated valve of claim 1 wherein the bias means is a compressed spring.

8. The fluid delivery force-actuated valve of claim 5 wherein said inlet port communicates with the first chamber.

9. The fluid delivery force-actuated valve of claim 5 wherein said outlet port communicates with the second chamber.

10. The fluid delivery force-actuated valve of claim 4 wherein said moveable means comprises a piston secured to seal means and said seal means is positioned within the second chamber where it can move to a first position to block said passage between the chambers and to a second position away from said passage so that fluid can be fed from the inlet port to the outlet port.

11. The fluid delivery force-actuated valve of claim 4 wherein the bias means is a compressed spring.

12. The fluid delivery force-actuated valve of claim 6 wherein said inlet port communicates with the first chamber and said outlet port communicates with the second chamber.

13. The fluid delivery force-actuated valve of claim 6 wherein said moveable means comprises a piston secured to seal means and said seal means positioned within the second chamber where it can move to a first position to block said passage between the chambers and to a second position away from said passage so that fluid can be fed from the inlet port to the outlet port.

14. The fluid delivery force-actuated valve of claim 13 wherein said inlet port is positioned to direct the incoming fluid at the top of the bellow means in the first chamber and said first chamber having a discharge to the passage located at the bottom of the bellows so that the incoming fluid will be forced to circulate around the bellow means in the first chamber.

15. A method for providing a fluid delivery system in which pressurized fluid fed into an input port and discharged from an output port can be regulated upon an application of a force independent of the pressure of the fluid, said method comprising the steps:

(a) providing an enclosed first chamber for receiving an input fluid; providing an enclosed second chamber for receiving the input fluid from the first chamber; and providing a passage between said first chamber and said second chamber;

(b) providing a moveable valve seal means for closing or opening said passage and providing biasing means to maintain said valve seal in the closed position;

(c) providing bellows in said first chamber attached to the moveable valve seal means so that an incoming fluid will exert a force directly on the bellows that will be directed on the moveable valve seal means to open it and providing said bellows so that the force exerted by the bellows from the incoming fluid to the moveable valve seal means is equal to or greater than the force exerted directly on the moveable valve seal means by the incoming fluid; and (d) supply an incoming pressurized fluid to the first chamber and a separate force against the moveable valve seal means to open it so that said incoming fluid is fed into said second chamber for discharge and said flow is continued or stopped depending on the separate force applied against the moveable valve seal means independent of the force of the incoming pressurized fluid.

16. The method of claim 15 wherein the incoming fluid is gas.

17. The method of claim 15 wherein the separate force is pneumatic pressure.

18. The method of claim 15 wherein the first chamber has a port for the incoming fluid located above the bellows and a port for the discharge of the fluid located below the bellows so that the incoming fluid will circulate around the bellows and effectively eliminate entrapment of fluid in the first chamber.

19. The method of claim 18 wherein the incoming fluid is gas.

20. The method of claim 18 wherein the separate force is pneumatic pressure.

* * * * *